United States Patent [19]

Nakagome et al.

[11] 4,121,258

[45] Oct. 17, 1978

[54] METHOD FOR CODING FACSIMILE SIGNAL

[75] Inventors: Yukio Nakagome, Yokohama; Hiroichi Teramura, Tokyo; Yasuhiro Yamazaki, Hiratsuka; Yasushi Wakahara, Tokyo, all of

[73] Assignee: Kokusai Denshin Denwa Kabushiki Kaisha, Japan

[21] Appl. No.: 740,073

[22] Filed: Nov. 8, 1976

[30] Foreign Application Priority Data

Nov. 7, 1975 [JP] Japan .................... 50-133745

[51] Int. Cl.$^2$ ............................................ H04N 1/40
[52] U.S. Cl. .......................... 358/260; 340/347 DD; 358/261
[58] Field of Search ................. 358/260, 261; 340/347 DD

[56] References Cited

U.S. PATENT DOCUMENTS

| | | | |
|---|---|---|---|
| 3,347,981 | 10/1967 | Kagan | 358/260 |
| 3,769,453 | 10/1973 | Bahl | 358/260 |
| 3,937,871 | 2/1976 | Robinson | 358/260 |
| 3,991,267 | 11/1976 | Beaudette | 358/260 |
| 4,035,837 | 7/1977 | Starck | 358/261 |

Primary Examiner—Howard W. Britton
Attorney, Agent, or Firm—Robert E. Burns; Emmanuel J. Lobato; Bruce L. Adams

[57] ABSTRACT

A method for coding a facsimile signal, in which addresses of information change picture elements each having information different from the immediately preceding picture element on the same scanning line of a facsimile signal are firstly coded for each scanning line to develop a first coded output. In response to the first coded output, the relative distance of each of the information change picture elements to a final reference change point which is selected from information change picture elements on the scanning line including the instant information change picture element to be coded or on at least one immediately preceding scanning line is secondly coded to develop a second coded output. The number of successive information change picture elements having the zero value of the relative distance or the order number of information change picture elements are thirdly coded for each scanning line in response to the second coded output.

4 Claims, 5 Drawing Figures

METHOD FOR CODING FACSIMILE SIGNAL

This invention relates to a coding method employed for efficient coding of facsimile signals having a high two-dimensional correlation to shorten the transmission time of the facsimile signals.

Conventional coding methods of facsimile signals of the type are 1 a run-length coding method, in which signals of one scanning line obtained by scanning are converted to a time serial configuration and then the magnitudes of the run lengths of white and black are successively coded for transmission; and 2 a plane coding method, in which signals of a plurality of scanning lines are subjected to batch processing and then coded for transmission. However, the coding method 1 does not utilize the property of picture signals that they have high correlation in a vertical direction and hence is not sufficient in the compression effect. The method 2 is excellent in the compression effect as compared with the method (1) but has such a defect that a memory used becomes generally large and complicated in construction.

The present inventors have previously proposed a System For Coding Information Change Picture Elements In Facsimile Signal, which avoids the defects of the above-said two coding methods and greatly eliminates redundancy of the facsimile signal by the use of a memory of relatively small capacity and a simple equipment to thereby enable remarked compression of a required transmission time with respect to the band-time integral U.S. Pat. No. 4,040,093.

In this system, for coding addresses of information change pictures elements in facsimile signals, a preceding information change picture element is selected as a final reference information change picture element which is considered to have higher correlation to the instant information change picture element desired to be coded than any other information change picture elements on the scanning line including the instant information change picture element and on the scanning line immediately preceding the abovesaid one, so that the relative distance of the final reference information change picture element to the instant information change picture element is coded.

An object of this invention is to provide a facsimile signal coding method which enables more efficient coding than the abovesaid coding method.

The principle of the present invention, on the basis of the fact that in the abovesaid facsimile signal information change picture element address coding method, the number of information change picture elements (hereinafter referred to simply as the change points) of zero relative distance is extremely large, is as follows:

(i) in the case of the change points of zero relative distance, the number of successive ones of them is coded, or (ii) their information of the change points of zero relative distance is not transmitted, but instead, in connection with the change points other than those of zero relative distances, for each of predetermined kinds of relative distances, the positions of occurrence of subsequent change points having the corresponding relative distances are each indicated by the order number of change points on each scanning line and this information is transmitted to further reduce redundancy, whereby to provide for further increased transmission speed in facsimile.

The present invention will be clearly understood from the following detailed description taken in conjunction with the accompanying drawings, in which.

Figure 1:
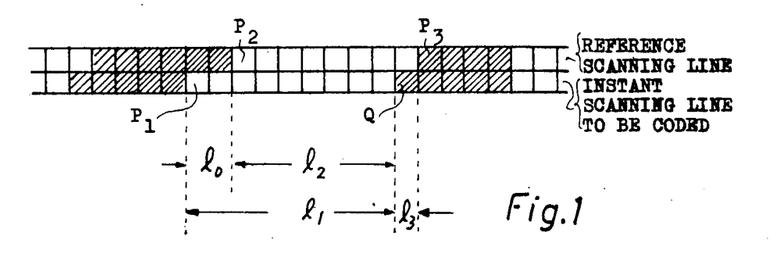
FIG. 1 is a scanning line pattern explanatory of the coding principle of this invention.

For ready understanding of this invention, a description will be given first of the invention of U.S. Pat. No. 4,040,093 "System For Coding Information Change Picture Elements In Facsimile Signal". FIG. 1 shows an example of the facsimile signal (white small sections indicate white picture elements and hatched small sections black picture elements). The principle of coding will be described by the use of the example shown in FIG. 1. In FIG. 1, there is depicted information of two scanning lines. The lower scanning line is one whose information is to be coded, and will hereinafter be referred to as the instant scanning line to be coded, and the upper scanning line is one which is used as reference information for coding the information of the instant scanning line to be coded, and will hereinafter be referred to as the reference scanning line. In FIG. 1, picture elements identified by characters $P_1$, $P_2$, $P_3$ and $Q$ are the change points which have information different from that of the immediately preceding picture elements. Now, let it be assumed that the address of the change point $Q$ is to be coded. With respect to the change point $Q$ to be coded, the reference change points $P_1$, $P_2$ and $P_3$ are defined as follows:

$P_1$: A change point immediately preceding the point $Q$ on the instant scanning line to be coded. (In the absence of such a change point, it is assumed to be a picture element at the left end of the instant scanning line.)

$P_2$: A first change point lying further to the right than the change point $P_1$ on the reference scanning line.

$P_3$: A change point following the change point $P_2$ on the reference scanning line. (In the absence of the change points $P_2$ and $P_3$, this change point is assumed to be a picture element at the right end of the reference scanning line.)

After determining the reference change points $P_1$, $P_2$ $P_3$ as described above, the relative distance between the change points $P_1$ and $P_2$ (the number of picture elements counted in a horizontal direction) $l_0$, taken as $|\overline{P_1P_2}|$ $(=l_0)$, $|\overline{P_1Q}|=l_1$, $|\overline{P_2Q}|=l_2$ and $|\overline{P_3Q}|=l_3$, and a predetermined number L (for instance, 3, 4) are compared with each other.

(i) In the case of $l_0 \leq L$, if $l_1 < l_3$, the change point $P_1$ is selected as a final reference change point and if $l_1 \geq l_3$, the change point $P_3$ is selected.

(ii) In the case of $l_0 > L$, if $l_1 < l_2$, the chance point $P_1$ is selected as the final reference change point and if $l_1 \geq l_2$, the change point $P_2$ is selected, and, as the address of the change point $Q$, the number of horizontal picture elements between the base change point and the change point $Q$ to be coded is coded.

In a case where the change point $P_2$ or $P_3$ is selected as the final reference change point, when the change point Q lies further to the right than the reference change point, a sign + is added (when the change point Q lies at the same position as the final reference change point, the sign + or − is not added), and when the change point Q lies further to the left than the final reference change point, the sign − is added. In a case where the final reference change point is selected to be $P_1$, no sign is added. Assuming that a coded output by coding employing this method is as follows:

$$0, -1, 0, 0, 0, 1, +1, 3, 0, 0, 0, 0, 0, +1 \quad (1)$$

$$1\ 2\ 3\ 4\ 5\ 6\ 7\ 8\ 9\ 10\ 11\ 12\ 13\ 14$$

each numerical value indicates the address of each change point.

In the present invention, the thus obtained output indicative of the relative distance of each change point to be coded is subjected to two kinds of processings, thereby to provide for further increased data compression.

A first processing, utilizing the property that the number of the change points having the zero relative distance accounts for about ½ of the total sum of change points, is to code the number of successive change points of zero relative distance. In practice, in successive coding of the addresses of the respective change points, the relative distance of each change point is coded, and if the relative distance is zero, the number of successive change points (more than one) is immediately coded. For example, if the aforesaid example (1) is used, the result is as follows:

$$0, 1, -1, 0, 3, 1, +1, 3, 0, 5, +1 \quad (2)$$

The number next to 0 in the example (2) does not indicate the relative distance but implies the number of "00 ..." occurring in succession. In this point, the examples (1) and (2) differ from each other. As a result of such a processing, the series before conversion includes many zeros, so that in the series after conversion, the amount of information is reduced and the number of coded bits is also decreased.

Figure 2:
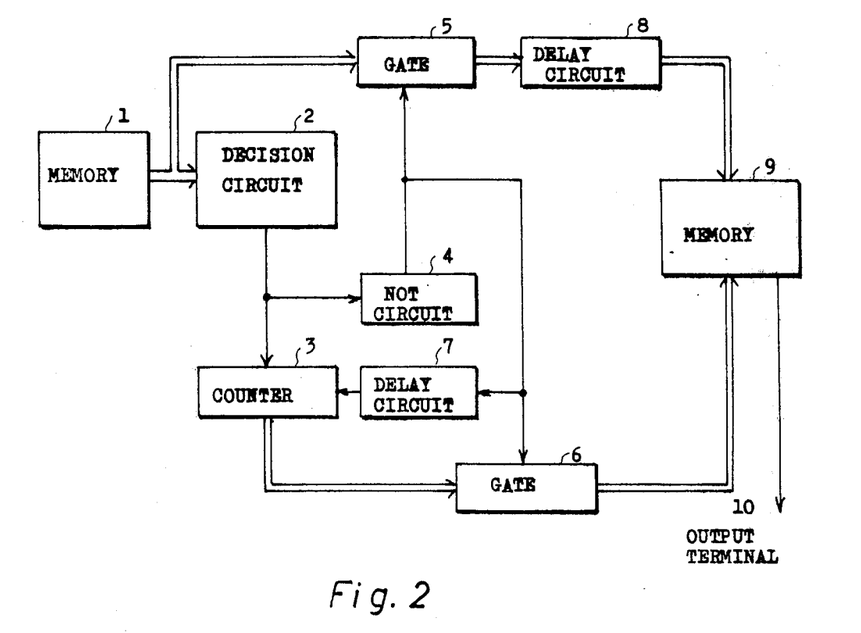
FIG. 2 is a block diagram illustrating an embodiment of this invention.

FIG. 2 is a block diagram illustrating an embodiment of this invention. In FIG. 2, reference numeral 1 indicates a memory for storing the coded output (for instance, the example (1)) produced by the facsimile signal information change picture element address coding method described above; 2 designates a decision circuit which reads out codes one by one from the memory 1 and decides whether the code is "0" or not and if "0", produces a pulse; 3 identifies a counter for counting the number of pulses derived from the decision circuit 2; 4 denotes a NOT circuit which negates the output pulse from the decision circuit 2; 5 and 6 represent gate circuits which are opened by the output pulse from the NOT circuit 4; 7 shows a delay circuit whose output pulse resets the counter 3 at zero; 8 refers to another delay circuit; 9 indicates a memory for temporarily storing transmission information and delivering out the information to an output terminal at a constant speed; and 10 designates the output terminal.

The operation of the embodiment shows in the block diagram of FIG. 2 will be described with regard to the example (1). Let is be assumed that the memory 1 has already written therein the series of the coded distances shown in the example (1). The relative distance information stored in the memory 1 is read out one by one and applied to the decision circuit 2 and the gate 5. The decision circuit 2 decides whether the relative distance information applied thereto is "0" or not, and produces a pulse only when the applied relative distance information is "0". In the example (1), since the first relative distance information is "0", the decision circuit 2 produces a pulse. At this time, the gate 5 is not supplied with the pulse from the NOT circuit 4 and hence is not opened, so that the relative distance information "0" does not pass through this gate 5. On the other hand, since the output pulses from the decision circuit 2 have been applied to the counter 3, their number has been counted therein. Next, the second relative distance information i- the example (1) is read out. In this case, the information is -1, not "0", so that the decision circuit 2 does not produce a pulse. Accordingly, the NOT circuit 4 produces a pulse, and the gates 5 and 6 are opened, so that the gate 5 derives therefrom the relative distance information −1 read out from the memory 1, and the gate derives therefrom the count value of the counter 3, that is, the number of output pulses applied thereto from the decision circuit 2 till then (=the number of successive relative distance information 0, i.e. in this example, one). At first, the count value of the counter 3 is stored in the memory 9, and then the value of the relative distance information −1 is stored in the memory 9 through the delay circuit 8. When the value of the counter 3 is stored in the memory 9, the information "0" is also stored at the same time. Further, at this time, the output pulse from the NOT circuit 4 is applied to the gates 5 and 6 to open them to pass therethrough the respective information, and then is also applied to the counter 3 to reset it to zero.

Thereafter, similar operations are repeated and the coded series shown in the example (1) is converted into such as shown in the example (2) and then stored in the memory 9. The information stored in the memory 9 is delivered out bit by bit through the output terminal 10 at a constant bit rate.

The information stored in the memory 9 is converted into variable-length codes in consideration of the transmission efficiency, and then delivered out. Namely, information of high probability of appearance is converted into a short bit-length code, while information of low probability of appearance is converted into a long bit-length code, whereby the number of bits produced is reduced. The technique of converting the information into the variable-length codes is known, but Table 1 shows its example and the code configuration on a transmission line. The information after the first processing is divided into (the sign representation) and (the absolute value representation).

Table 1

| | (Sign representation) |
|---|---|
| Sign | Code on transmission line |
| No sign | 0 |
| + sign | 1 0 |
| − sign | 1 1 |

| | (Absolute value representation) |
|---|---|
| Absolute value | Codes on transmission line |
| 0 | 0 |
| 1 | 1 0 |
| 2 | 1 1 0 |
| 3 | 1 1 1 0 |
| ... | n |
| n | 1 1 ..... 1 0 |

This information after the first processing (for instance, the series of the example (2)) is classified into information signed with + or − and non-signed information, and the signs for distinguishing them are shown in the part of the (sign representation) of Table 1. For sign representation, one or two bits are employed as sign bits, and by examining a first bit, it can be known whether or not the information is signed with + or −. In other words, if the first bit is "0", the information is not signed and if the first bit is "1", the information is signed. In the case of the signed information, checking a second bit will indicate whether the information is signed with + or −. Namely, if the second bit is "0", the information is signed with + and if the second bit is "1", the information is signed with −. The absolute value representation is a part indicating the absolute of the information, and has an arrangement such, for example, as shown in Table 1. In the present example, information whose absolute value is $n$ is represented by a train of successive "1 . . . " of $n$ number and an additional one "0", so that when it is decoded, its absolute value can be readily obtained by checking the number of "11 . . . 1" occurring in succession.

Figure 3:
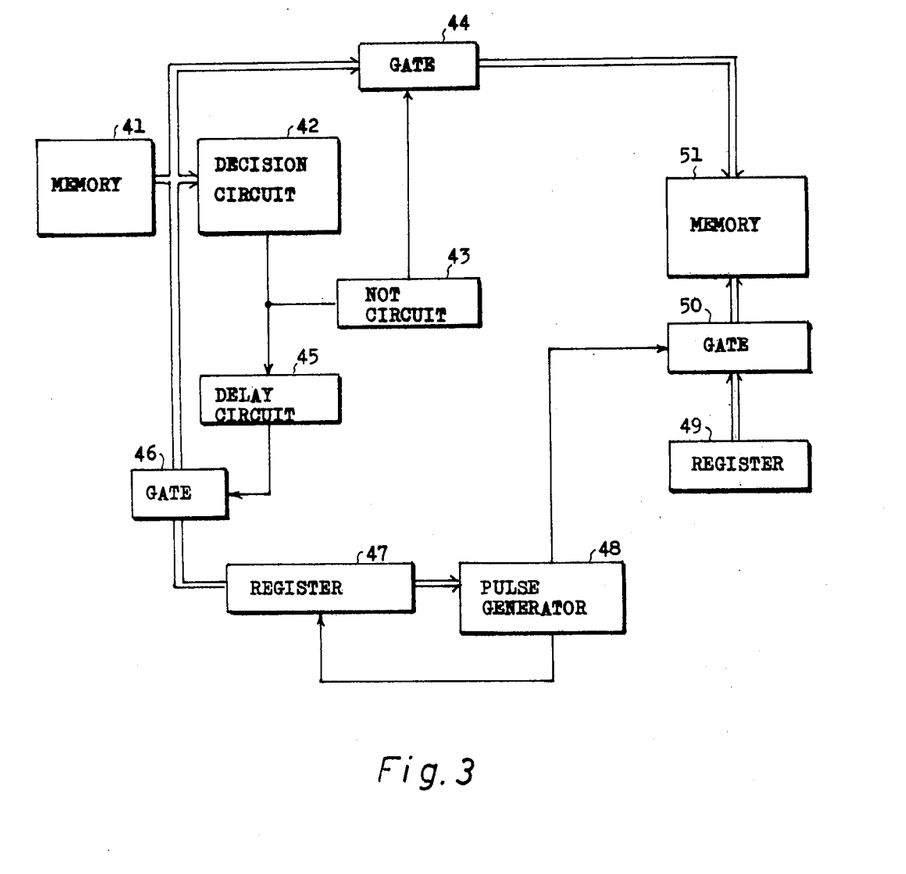
FIG. 3 is a block diagram illustrating an example of the receiving side for receiving a facsimile signal produced by the embodiment shown in FIG. 2.

FIG. 3 is a block diagram illustrating an example of the construction of the receiving side for receiving the facsimile signal produced from the example of the block diagram of FIG. 2. The block diagram of FIG. 3 shows a part for processing a signal produced by converting variable-length codes of the transmission line to equal-length code units. Reference numeral 41 indicates a memory for storing an input facsimile signal (for instance, the series (2)); 42 designates a decision circuit which reads out information from the memory 41 for each code unit of about ten bits, and decides whether the information content is "0" or not, and if "0", produces a pulse; 43 identifies a NOT circuit; 44 denotes a gate; 45 represents a delay circuit; 46 shows a gate; 47 refers to a register; 48 indicates a pulse generator which receives information from the register 47 to produce a pulse or pulses corresponding to the received information and resets the value of the register 47 to zero after producing the pulse or pulses; 49 designates a register for storing a bit pattern corresponding to the "0" information in the input facsimile signal series; 50 identifies a gate; and 51 denotes a memory for storing information after this reverse conversion of the first processing.

The operation of the circuit shown in FIG. 3 is as follows: The coded information of the facsimile signal stored in the memory 41 is decided by the decision circuit 42 for each code unit as to whether it is "0" or not. When the coded information is not "0", the gate 44 is opened, through which the information is stored, as it is, in the memory 51 again. When the information from the memory 41 is "0", the decision circuit 42 provides a pulse to open the gate 46. Namely, information following the information "0" (a successive number of "0") is applied to the register 47. In the register 49, there is stored a bit pattern corresponding to the coded information "0", and the pulse generator 48 produces pulses corresponding in number to the information stored in the register 47 to open the gate 50, so that information corresponding to "0" is stored in the memory 51 in accordance with the information stored in accordance with the information stored in the register 47. In this manner, a reverse conversion of the first processing is carried out.

In the above description, it has been assumed that in order to distinguish the code representative of the number of successive "0" from the other codes, the iformation following the relative distance information "0" to be coded indicates the number of successive "0" and the other information the relative distance. As an alternative, it is also possible to provide information "0" immediatelypreceding the code indicating the number of successive "0" and to provide information "1" immediately preceding the other codes.

The second processing, also utilizing the property that the change points having the relative distance information "0" accounts for about one-half the total sum of change points, is as follows: Only in connection with the change points other than those of the relative distance information "0", for each relative distance information, the order of subsequent change points having the same relative distance is indicated by the number of change points on each scanning line, and the indicated information is transmitted one after another, and in connection with the change points of zero relative distance, no information is transmitted.

For example, in the series of the example (1), since the change points having the relative distance information +1 are seventh and fourteenth change points, they are expressed as follows;

$$+1, 7, 7, \ldots (3)$$

In the example (3), the third number is not fourteen but seven, and this indicates that the order number of the second change point of the relative distance information +1 is seventh from the seventh change point. The change point of the relative distance information −1 is the second one, and is indicated as follows:

$$-1, 2, \ldots (4)$$

The change point of the relative distance "1" is the sixth one, but it is fifth, excepting the change points already counted, so that it is represented as follows:

$$1, 5, \ldots (5)$$

The procedures such as described above are repeated for each of the remaining relative distance information. That is, by the above processing, the example (1) of the series of the relative distance information is converted as follows:

$$+1, 7, 7, -1, 2, 1, 5, 3, 5, \ldots (6)$$

The underlined numerals in the example (6) each indicate the relative distance, and the other numerals each represent the position of occurrence of the change point. In this series, the change points which are not given the relative distance, are of zero relative distance. It is the feature of the second processing that this information of zero relative distance is not transmitted. As is evident from the above example, the conversion into such a series leads to the reduction of the number of transmitted information and the number of bits required for coding.

Figure 4:
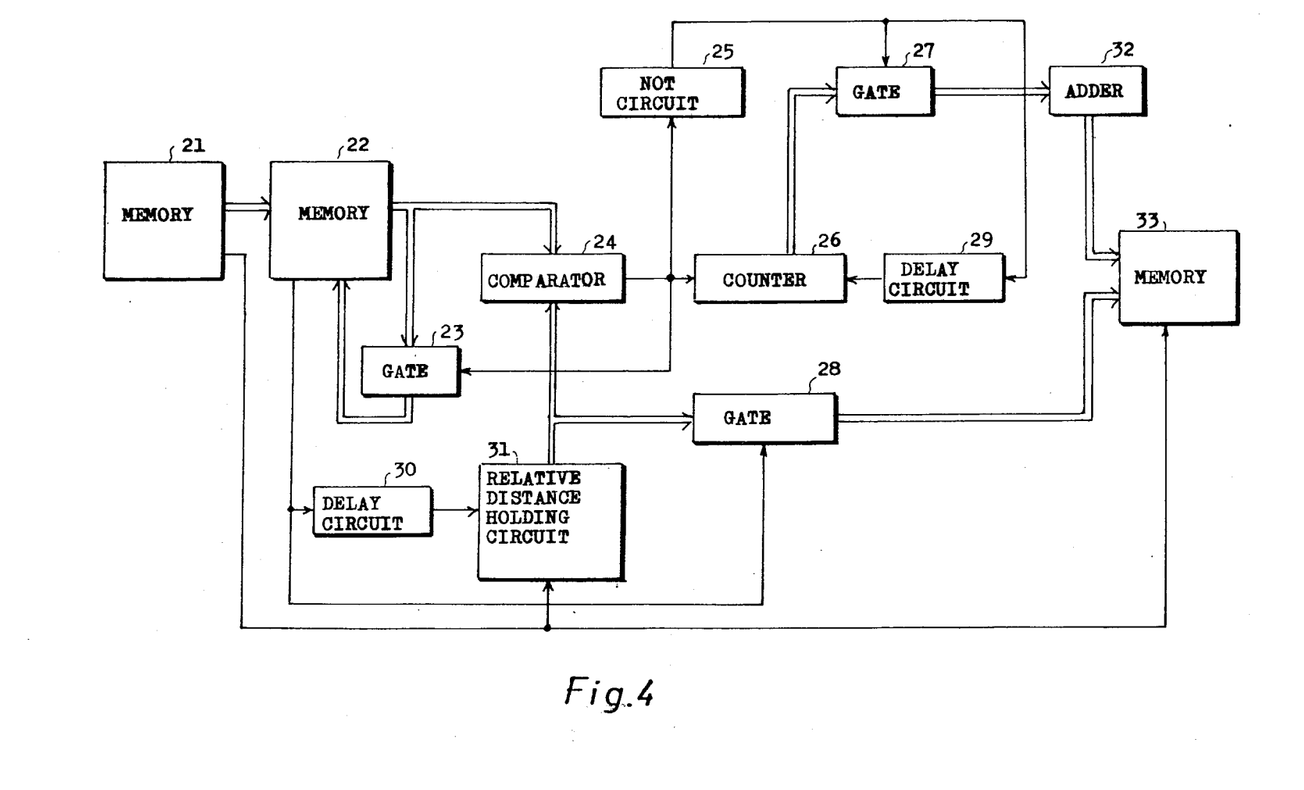
FIG. 4 is a block diagram illustrating another embodiment of this invention.

FIG. 4 is a block diagram illustrating another embodiment of this invention. In FIG. 4, reference numeral 21 indicates a memory which stores the coded output (for instance, the example (1)) of the abovesaid System, For Coding Information Change Picture Elements In Facsimile Signal, and provides the coded information, for example, for each scanning line, as is the case of the memory 1 in FIG. 2; and 22 designates a memory which receives and stores the information of, for instance, one scanning line, from the memory 21, and which upon completion of processing of the information of the scanning line, receives from the memory 21 the information of the next scanning line. Reference numeral 23 identifies a gate. When the gate 23 is opened, the information read out from the memory 22 is stored again in the memory 22 through this gate 23. Reference numeral 24 denotes a comparator which reads out the relative distance information of each change point from the memory 22, and compares the readout information with the value of a relative distance holding circuit 31, described later, as to whether or not they are equal to each other, and if not, produces a pulse. Reference numeral 25 represents a NOT circuit, 26 shows a counter for counting the output pulses derived from the comparator 24; 27 refers to a gate which is opened when the NOT circuit 25 provides a pulse; and 28 indicates a gate which is opened by the pulse from the memory 22. Reference numerals 29 and 30 indicate delay circuits. When the NOT circuit 25 produces a pulse, the gate 27 is opened, through which the value of the counter 26 is applied to an adder 32, and the counter 26 is cleared to "0" by a pulse applied thereto through the delay circuit 29. Reference numeral 31 designates the relative distance holding circuit formed with counters and registers. When the information stored in the memory 22 has all been read out therefrom (the readout information including the information re-stored in the memory 22 through the gate 23), the memory 22 supplies a pulse to the relative distance holding circuit 31, thereby counting-up the value of the counter in the circuit 31. On the other hand, the memory 21 applies the information of a certain number of scanning lines and, at the same time, supplies a pulse to the counter 31, whereby the holding circuit 31 is cleared to "0". Reference numeral 32 identifies the adder which adds one to the input thereto; and 33 denotes a memory for storing information until it is sent out.

The operation of the embodiment shown in the block diagram of FIG. 4 is as follows: As already mentioned, the memory 21 has stored therein the relative distance information of each change point, such as shown in the example (1), and when processed information has been stored in the memory 33 after completion of the processing for coding of each scanning line, the memory 21 applies change point information of, for example, one scanning line to the memory 22, and at the same time, supplies a pulse to the relative distance holding circuit 31, to set the value of the holding circuit 31 to its initial value. The value indicated by the holding circuit 31 is the relative distance, and is successively updated to $+1$, $-1$, $1$, $+2$, $-2$, $2$, $+3$, $-3$, $3$, ... $+n$, $-n$, $n$ ($n$ being the number of picture elements included in one scanning line) one after another, and this is achieved by the output pulses from the memory 22. The relative distance information of each change point stored in the memory 22 is read out therefrom one by one, and applied to the comparator 24. In the comparator 24, the relative distance information of the change point and the relative distance holding circuit 31 are compared with each other as to whether or not they are the same as each other. If they are different from each other, the comparator 24 generates a pulse, so that the gate 27 is closed and nothing is stored in the memory 33, but instead the counter 26 counts the pulse generated from the comparator 24. The relative distance information of the change point read out into the comparator 24 is stored again in the memory 22 through the gate 23 which is opened in this case. Conversely, if the two inputs to the comparator 24 are the same, the comparator 24 does not produce the pulse, so that the gate 27 is opened, through which is transferred to the adder 32 the value of the counter 26, that is, the number of change points between the change point read out into the comparator 24 and the immediately preceding change point having the same relative distance as the former (the relative distance held in the holding circuit 31), and the result of addition in the adder 32 is applied to the memory 33. When the value of the counter 26 has been transferred to the memory 32, the counter 26 is reset to zero by a pulse from the delay circuit 29. On the other hand, at this time, since the gate 23 is closed, the relative distance information read out from the memory 22 is discarded without being re-stored in the memory 22. When storing in the memory 33 has been completed, the relative distance information of the next change point is read out from the memory 22 and the operations described are repeated. Thus, in connection with each change point having the same relative distance as that held in the relative distance holding circuit 31, the number of change points of other relative distances lying between the change point and the immediately preceding one of the same relative distance is counted by the counter 26, and the value, after added with one, is stored in the memory 33. Since the address coded information of the change point of this relative distance is not re-stored in the memory 22 through the gate 23, it is not used in the processing for the change point of the next relative distance.

When the processing for one relative distance has been completed in this manner, it is detected by reading out of all information written in the memory 22, and at this time, the memory 22 applies a pulse to the gate 28, so that the relative distance information held in the holding circuit 31 is written in the memory 33 through the gate 28. Further, the output pulse from the memory 22 is supplied through the delay circuit 30 to the holding circuit 31, and the content of the holding circuit 31 is updated to the next relative distance information as described previously. Moreover, the relative distance information of the change point is again read out therefrom one by one, and the above-said processings are repeated.

When the above processings has been repeated to complete processing for the information of one scanning line stored in the memory 22, the relative distance information of the next scanning is transferred from the memory 21, and at the same time, the value of the holding circuit 31 is set to its initial value.

The information stored in the memory 33 is sent out after being converted into variable-length codes in consideration of the transmission efficiency. Namely, the information of high probability of appearance is converted into a code of short bit length, and the information of low probability of appearance is converted into a code of long bit length, thereby to reduce the number of output bits. The technique for converting into the variable-length code is well-known and Table 2 shows its example, showing the code configuration on the transmission line. Since the information after the second processing is divided into two: the information indicative of the relative distance and the information representative of the address at which the change point having the relative distance occurs, the configuration of the code on the transmission is such that one bit distinguishing one from the other is added with a code indicative of the relative distance or the address. The signs employed in the latter may be those shown in Table 1.

Table 2

| (Distinction between relative distance and address) | |
|---|---|
| | Code on transmission line |
| Relative distance | 0 |
| Address | 1 |

| (Sign representation) | |
|---|---|
| Sign | Code on transmission line |
| No sign | 0 |
| + sign | 1 0 |
| − sign | 1 1 |

(Absolute value representation of relative distance)
(Address indication)

| (Absolute value or address of relative distance | Code on transmission line |
|---|---|
| 0 | 0 |
| 1 | 1 0 |
| 2 | 1 1 0 |
| 3 | 1 1 1 0 |
| . | . |
| . | . |
| . | . |
| n | 1 1 1 1 ... 1 0 (n) |

Figure 5:
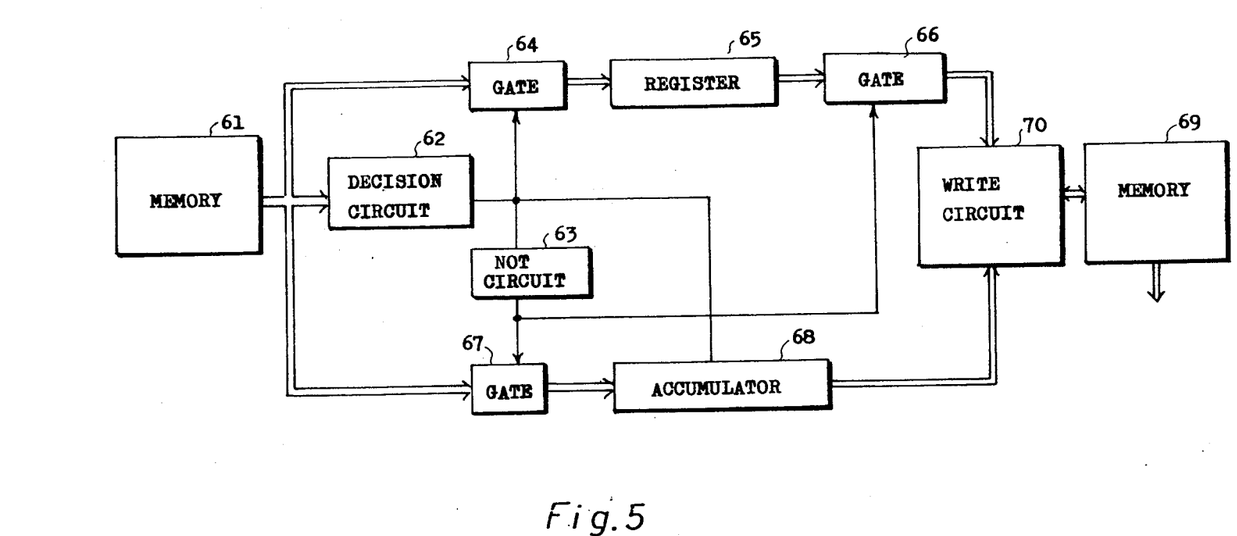
FIG. 5 is a block diagram illustrating an example of the receiving side for receiving a facsimile signal produced by the embodiment shown in FIG. 4.

FIG. 5 is a block diagram showing an example of the receiving side for the reception of the facsimile signal produced by the embodiment shown in the block diagram of FIG. 4. This block diagram shows a part for processing the signal obtained after the variable-length codes on the transmission line has been converted into equal-length codes. Reference numeral 61 indicates a memory for storing an input facsimile signal (for instance, the series (2)); and 62 designates a decision circuit which reads out the information from the memory 61, and decides whether the content of the information is the information indicative of the coded distance or the address, and produces a pulse in the former case. Reference numeral 63 identifies a NOT circuit; 64 denotes a gate; 65 represents a register; 66 shows a gate; 67 refers to a gate; 68 indicates an accumurator for accumurating the value of the information from the gate 67; and 7- designates a write circuit for writing the information from the gate 66 in a memory 69, the address information to be written being received as absolute address information of the part which has not been written in the memory 69 from the accumurator 68.

The operation of the circuit shown in FIG. 5 is as follows: The facsimile coded information stored in the memory 61 is decided for each code unit whether it is representative of the relative distance or the address, by checking the first bit of the coded information in the decision circuit 62. In the case of the information indicative of the relative distance, the decision circuit 62 produces a pulse, so that the gate 64 is opened, through which the information is stored in the register 65. At this time, the accumurator 68 is cleared to "0". When the information is the address of the change point as a result of the decision, the gate 67 is opened, through which the information is accumurated in the accumurator 68. At this time, since the gate 66 is also opened, the code indicating the relative distance of the change point stored in the register 65 is written in the memory 69. The memory 69 is a memory which stores the relative distances of change points of, for example, one scanning line, in accordance with the order of appearance of the change points, but they are written in the order of reception of the change points. Since the both orders are not usually in agreement with each other, the relative distance information of the change points is written in the memory 69 at random for each group of change points of the same relative distance. In connection with the address for writing the information of the address after the second processing, shown by the series (6), is accumurated by the accumurator 68, whereby are obtained the absolute addresses of those change points which have not yet been written in the memory 69. The write circuit 70 receives this information from the accumurator 68, and counts the number of only the change points which have not yet been written in the memory 69, and writes it in the address having become equal to the value of the accumurator 68. By repeating such operations, the series (6) is converted to the series (1), and is stored in the memory 69. This operation is completed, for instance, for each scanning line, and recording is effected.

The foregoing is the method in which in connection with the change points other than those of the relative distance "0", the subsequent change points having the relative distance of each same kind are sequentially processed into codes indicative of their positions on the scanning line, and the other change points which are not subjected to processing for coding are all regarded as having zero relative distance.

It is also considered possible to employ the following method which is a little modified from the above method. That is, the change points of the relative distances of low possibility of occurrence (for example, the relative distances other than +0, +1 and −1) are all handled by batch processing without being classified according to their relative distance, and for distinguishing each of the relative distances from the others, when the relative distance is processed for coding, the relative distances are also coded at the same time. For example, in the case of the series of the example (1), the processings for coding of the relative distances +1 and −1 are the same, but the other relative distances are coded in the order of occurrence of their change points as follows:

1, 5, 3, 1 ... (7)

The underlined numerals in the example (7) indicate the relative distances and the numerals following them are each indicative of the number of change points between the change points of the same relative distance, excepting the change points of the relative distances +1 and −1 which have already been processed for coding.

As has been described above in detail, in the present invention, the output of the System For Coding Information Change Picture Elements In Facsimile Signal is further processed by utilizing the property that the number of change points of zero relative distance is very large. As a result of this processing, the amount of information to be transmitted is reduced, so that the number of bits necessary for coding, in other words, the transmission time, can be effectively decreased.

What we claim is:

1. A method for coding a facsimile signal comprising the steps of:
   first coding, for each scanning line, addresses of information change picture elements each having information different from the immediately preceding picture element on the same scanning line of a facsimile signal to develop a first coded output; and
   receiving said first coded output and secondly coding the relative distance of each of said information change picture elements to a final reference change point which is selected from information change picture elements on at least one scanning line including the instant scanning line having an instant information change picture element to be coded to develop a second coded output.

2. A method for coding a facsimile signal according to claim 1, further including:

receiving said second coded output and thirdly coding for each scanning line the number of successive information change picture elements having a zero value of said relative distance.

3. A method for coding a facsimile signal according to claim 1, further including:

receiving said second coded output and selecting significant information change picture elements each having a non-zero relative distance other than zero; and thirdly coding positions of occurrences of said significant information change picture elements for each predetermined kind of said relative distance by the use of the order number of information change picture elements from an immediately preceding information change picture element having the same relative distance as the instant information change picture element on the same scanning line.

4. A method of coding a facsimile signal comprised of successive scanning lines each comprised of a sequence of picture elements, said method comprising:

coding for each scanning line addresses of information change picture elements having information different from an immediately preceding picture element on the same scanning line; and coding the relative distance of each of the coded information change picture elements to a reference information change picture element.

* * * * *